United States Patent [19]
Shin

[11] Patent Number: 5,381,490
[45] Date of Patent: Jan. 10, 1995

[54] IMAGE PROCESSING APPARATUS FOR EMPHASIZING EDGE COMPONENTS OF AN IMAGE

[75] Inventor: Jae-Sub Shin, Seoul, Rep. of Korea

[73] Assignee: Samsung Electronics Co. Ltd., Suwon, Rep. of Korea

[21] Appl. No.: 933,355

[22] Filed: Aug. 19, 1992

[30] Foreign Application Priority Data

Aug. 20, 1991 [KR] Rep. of Korea ............ 91-14313

[51] Int. Cl.$^6$ ............................................. G06K 9/40
[52] U.S. Cl. ................................. 382/54; 358/462
[58] Field of Search ............... 382/54, 41, 22, 27, 382/31; 358/462

[56] References Cited

U.S. PATENT DOCUMENTS

| | | | |
|---|---|---|---|
| 4,554,593 | 11/1985 | Fox et al. | 382/54 |
| 4,583,970 | 8/1989 | Ott et al. | 382/54 |
| 4,953,114 | 8/1990 | Sato | 382/54 |
| 5,023,919 | 6/1991 | Wataya | 382/54 |
| 5,073,959 | 12/1991 | Sugiura et al. | 382/54 |
| 5,134,667 | 7/1992 | Suzuki | 382/17 |

*Primary Examiner*—David K. Moore
*Assistant Examiner*—D. R. Anderson
*Attorney, Agent, or Firm*—Chernoff, Vilhauer, McClung & Stenzel

[57] ABSTRACT

There is disclosed an image processing apparatus for emphasizing edge components of an image signal to be provided from an image input system. The apparatus further comprises a mode selector for receiving predetermined data of a frame signal applied from a frame memory and determining if a pixel corresponds to one of a mode for emphasizing edge components of the image signal, a mode for smoothing uniform components of the image data and a normal mode in accordance with relations of adjacent pixels of the image signal to generate respective controlling signals for the respective modes; an emphasizing circuit for performing a first calculating operation so as to generate an edge component emphasizing data, when a controlling signal from the mode selector is provided for the edge component emphasizing mode; and a smoothing circuit for performing a second calculating operation so as to generate an uniform component smoothing data, when a controlling signal from the mode selector is provided for the smoothing mode. According to the circuit, since the circuit can emphasize edge components of an image signal to be displayed or written, it is possible to enhance quality of an image.

4 Claims, 13 Drawing Sheets

| i−2,j−2 | i−2,j−1 | i−2,j | i−2,j+1 | i−2,j+2 |
|---------|---------|-------|---------|---------|
| i−1,j−2 | i−1,j−1 | i−1,j | i−1,j+1 | i−1,j+2 |
| i,j−2   | i,j−1   | i,j   | i,j+1   | i,j+2   |
| i+1,j−2 | i+1,j−1 | i+1,j | i+1,j+1 | i+1,j+2 |
| i+2,j−2 | i+2,j−1 | i+2,j | i+2,j+1 | i+2,j+2 |

FIG.1A

| p(i−2,j−2) | p(i−2,j−1) | p(i−2,j) | p(i−2,j+1) | p(i−2,j+2) |
|---|---|---|---|---|
| p(i−1,j−2) | p(i−1,j−1) | p(i−1,j) | p(i−1,j+1) | p(i−1,j+2) |
| p(i,j−2) | p(i,j−1) | p(i,j) | p(i,j+1) | p(i,j+2) |
| p(i+1,j−2) | p(i+1,j−1) | p(i+1,j) | p(i+1,j+1) | p(i+1,j+2) |
| p(i+2,j−2) | p(i+2,j−1) | p(i+2,j) | p(i+2,j+1) | p(i+2,j+2) |

FIG.1B

| | | | | |
|---|---|---|---|---|
| i−2,j−2 | | i,j−2 | | i+2,j−2 |
| | | | | |
| i−2,j | | i,j | | i+2,j |
| | | | | |
| i−2,j+2 | | i,j+2 | | i+2,j+2 |

FIG.2A

OPPOSITE DIAGONAL COMPUTATION: Sub(1) = |p(i-2,j-2)-p(i+2,j+2)|

VERTICAL COMPUTATION: Sub(2) = |p(i-2,j)-p(i+2,j)|

DIAGONAL COMPUTATION: Sub(3) = |p(i-2,j+2)-p(i+2,j-2)|

HORIZONTAL COMPUTATION: Sub(4) = |p(i,j-2)-p(i,j+2)|

MAXIMUM VALUE: SEL=Max|Sub(1),Sub(2),Sub(3),Sub(4)|

FIG.2C

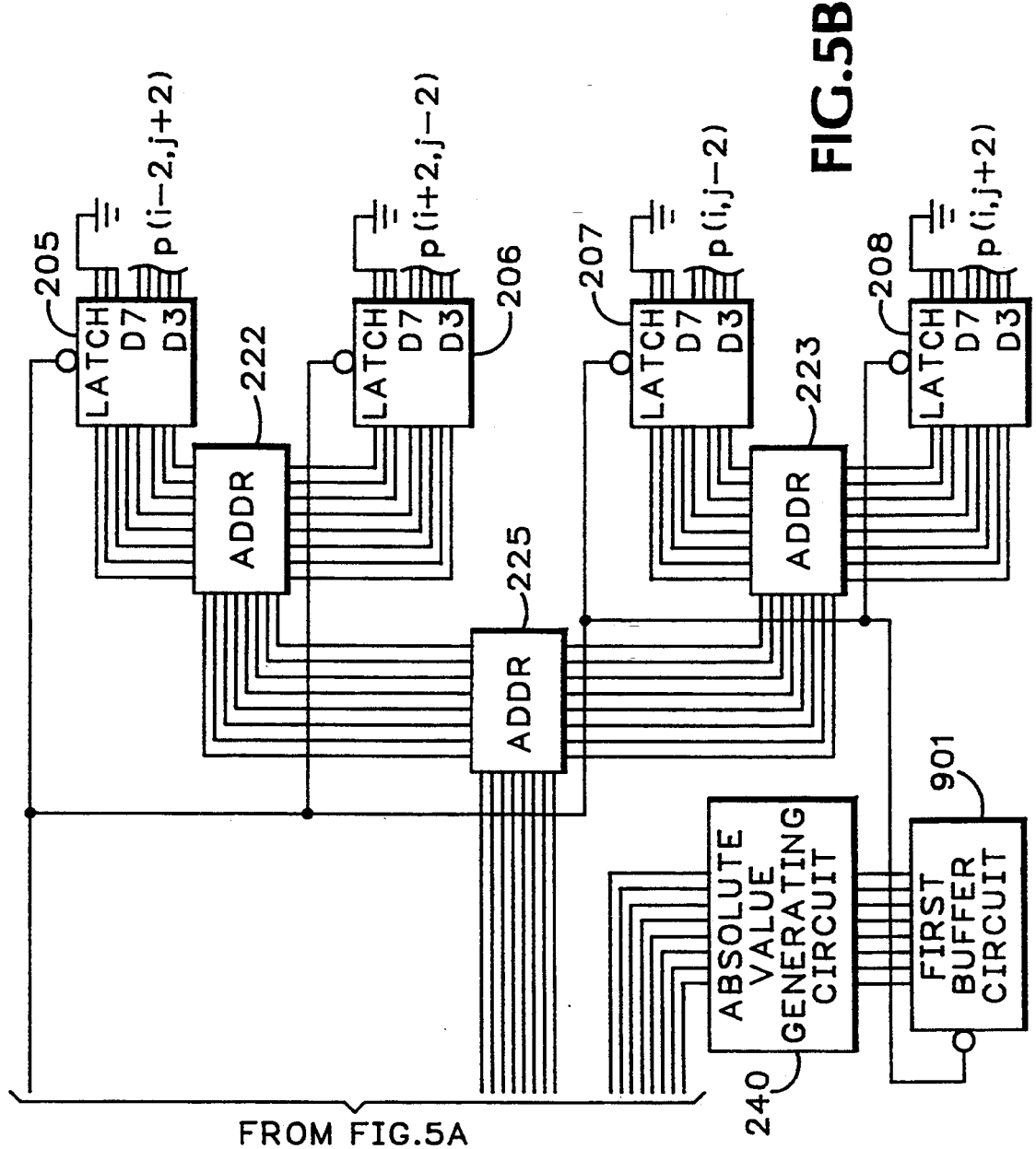

| -1/8 | | -1/8 | | -1/8 |
|---|---|---|---|---|
|  |  |  |  |  |
| -1/8 |  | 2 |  | -1/8 |
|  |  |  |  |  |
| -1/8 |  | -1/8 |  | -1/8 |

FIG.7A

$\frac{1}{10} \times$

| 1 | | 1 | | 1 |
|---|---|---|---|---|
|  |  |  |  |  |
| 1 |  | 2 |  | 1 |
|  |  |  |  |  |
| 1 |  | 1 |  | 1 |

FIG.7B

IMAGE PROCESSING APPARATUS FOR EMPHASIZING EDGE COMPONENTS OF AN IMAGE

BACKGROUND OF THE INVENTION

1. Field of the Invention

The present invention relates to an image processing apparatus for enhancing the quality of picture images, and more particularly to an image processing apparatus including an edge component emphasizing circuit for emphasizing the edge components of a digital image signal to be provided from an image input system.

In detail, the image processing apparatus of the present invention is provided for improving the quality of picture images in due consideration of mutual relations of adjacent pixels of an image applied from an image input system such as a video camera, image scanner, facsimile and so on.

2. Description of the Prior Art

A block diagram of the prior art image processing apparatus is shown in FIG. 8. Referring to FIG. 8, the image processing apparatus comprises an analog-to-digital converter 3 for converting an analog image signal applied from an image sensor 1 into digital image data; a frame memory 4 for storing the digital image data and outputting a frame signal; and an output selector 5 for providing the frame signal for at lest one of a display monitor 6, a printer 7, and a storage device 5 and so on.

Numeral 2 is a sample-and-hold circuit which prevents the occurrence of errors due to the input of a following analog image signal before completion of converting an analog image signal inputted in advance during the converting operation of the converter 3.

As seen from the above construction, the prior art image processing apparatus has been developed not just for emphasizing edge components of an image to improve image quality, but also for reproducing original picture images thoroughly. Also, when emphasizing edge components of an image is shown in the prior art, such edge component emphasizing means is realized with software (that is, programming means). To emphasize edge components by such software processing techniques is inadequate in a data processing system necessary for real time application and also to perform an enormous amount of complicated work in a short time.

Techniques for emphasizing sharpness of picture images without an edge component emphasizing circuit are disclosed in U.S. Pat. No. 4,785,347 and U.S. Pat. No. 4,237,481.

SUMMARY OF THE INVENTION

Accordingly, it is an object of the present invention to provide an image processing apparatus for emphasizing edge components of an image in consideration of mutual relations of adjacent pixels of digital image data to be applied from an image input system, in which, after selecting either an edge component emphasizing mode, a uniform component smoothing mode or a normal mode in accordance with the mutual relations, pixel values corresponding to the respective modes are computed by predetermined computing means and used for emphasizing or smoothing the edge components of the image so as to improve image quality.

It is another object of the present invention to provide an image processing apparatus for emphasizing edge components of an image which comprises a hardware circuit for real time processing of image data.

According to an aspect of the present invention, there is provided an image processing apparatus for emphasizing edge components of an image, the apparatus comprising:

an analog to digital converter for converting an analog image signal applied from an image sensor into digital image data;

a frame memory for storing the digital image data and outputting a frame signal;

a mode determining means for receiving predetermined data of the frame signal applied from said frame memory and determining if a pixel calls for implementation of a mode for emphasizing edge components of the image signal, a mode for smoothing uniform components of the image data or a normal mode in accordance with relations of adjacent pixels of the image signal to generate respective controlling signals for the respective modes;

an emphasizing means for performing a first calculating operation so as to generate edge component emphasizing data, when a controlling signal from said mode determining means is provided for the edge component emphasizing mode;

a smoothing means for performing a second calculating operation so as to generate uniform component smoothing data, when a controlling signal from the mode determining means is provided for the smoothing mode; and an outputting selector for providing the edge component emphasizing data, the uniform component smoothing data and unconverted data corresponding to the normal mode to at least one external device.

The apparatus may further comprise a first buffer means for storing the edge component emphasizing data from said emphasizing means; a second buffer means for storing the unconverted data from the mode determining means; and a third buffer means for storing the uniform component smoothing data from said smoothing means, wherein the data stored in the first, second and third buffer means are outputted by an enable signal from the mode determining means and the outputted data are provided for the external devices through the outputting selector.

In the apparatus, the mode determining means has a microcomputer for providing predetermined controlling signals for the mode determining means by using a controlling program in a storage device; a decoder for decoding addresses from the microcomputer and outputting an enable signal; and AND gate for receiving the enable signal and a read/write controlling signal applied from the microcomputer to the frame memory and then outputting a latch enable signal; a latching means for storing edge components of pixels of the frame signal applied from the frame memory by means of the latch enable signal; a first operating means for outputting respective absolute values calculated by subtracting respectively a plurality of pairs of edge components positioned at respective operating directions; a maximum detecting means for outputting a maximum value of the absolute values in response to the enable signal applied from said decoder; and a comparing means for comparing the maximum value with respective first and second reference values set for detecting edge or uniform components of a pixel and outputting the controlling signal for emphasizing the edge components, smoothing the uniform components and directly outputting normal components of unconverted data.

Also, in the apparatus, the emphasizing means comprises a first dividing means for dividing data of the respective edge components stored in the latching means by eight, respectively; a first adding means for adding output of the first dividing means; a second dividing means for dividing data of a specific component applied by means of the microcomputer by two; and a second operating means for outputting an absolute value calculated by subtracting output of the first adding means and the second dividing means from each other.

BRIEF DESCRIPTION OF THE DRAWINGS

This invention may be better understood and its numerous objects and advantages will become apparent to those skilled in the art by reference to the accompanying drawings as follows:

FIGS. 1A and 1B illustrate coordinate values shown in a 5 by 5 window of image data applicable to the present invention, and pixel values corresponding to the coordinate values;

FIGS. 2A to 2C illustrate coordinate values of only edge components in the coordinate values shown in FIG. 1A, respective computing directions of the coordinate values of the edge components, and computing expressions according to the respective computing directions;

FIGS. 7A and 7B show a computing window of the edge components in order to perform the computation for emphasizing the edge components, and a computing window of uniform components in order to perform a computation for smoothing the uniform components.

DESCRIPTION OF THE PREFERRED EMBODIMENT(S)

Figure 3:
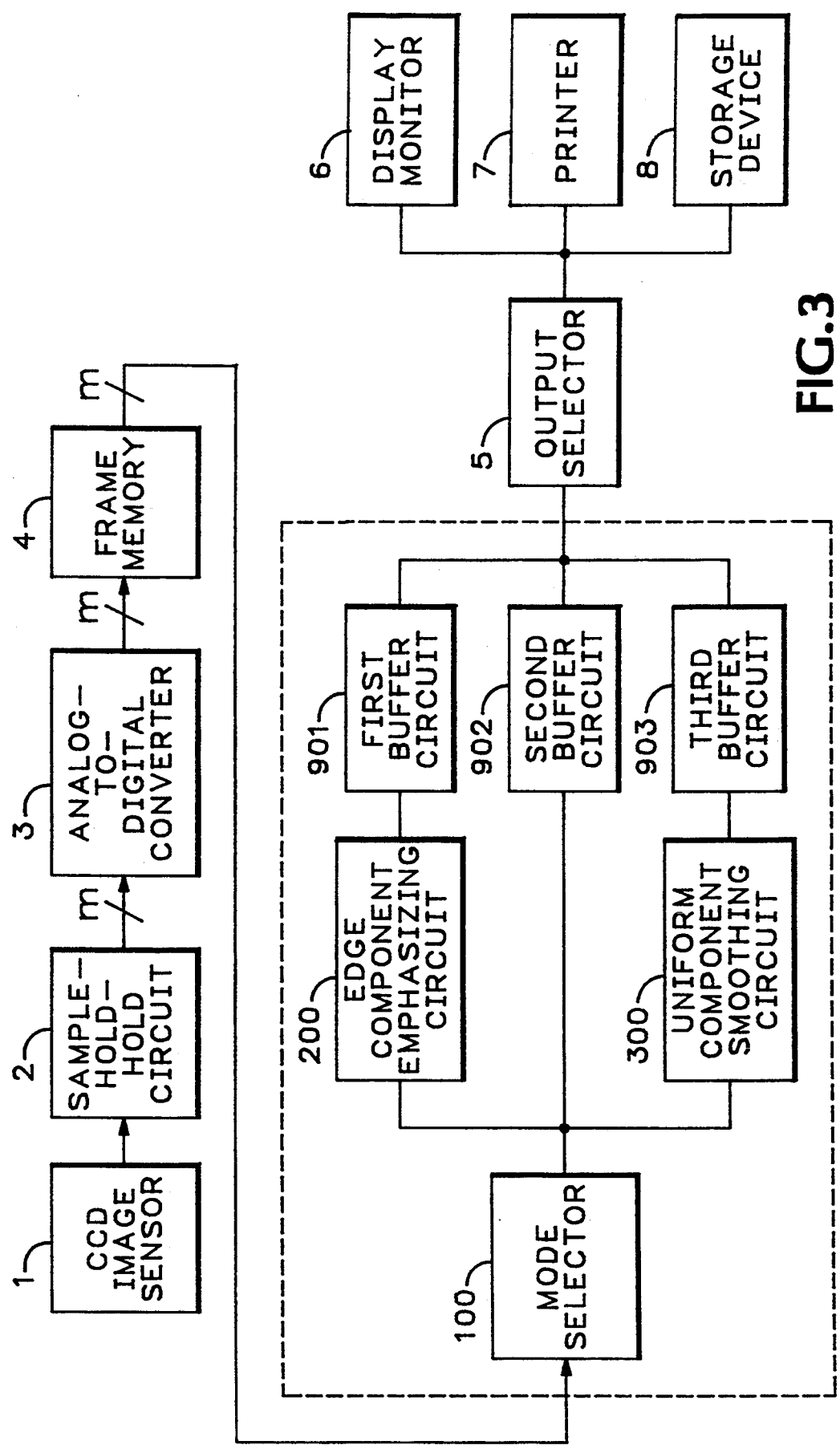
FIG. 3 shows a circuit diagram of an image processing apparatus including an edge component emphasizing circuit according to the present invention.
Figure 8:
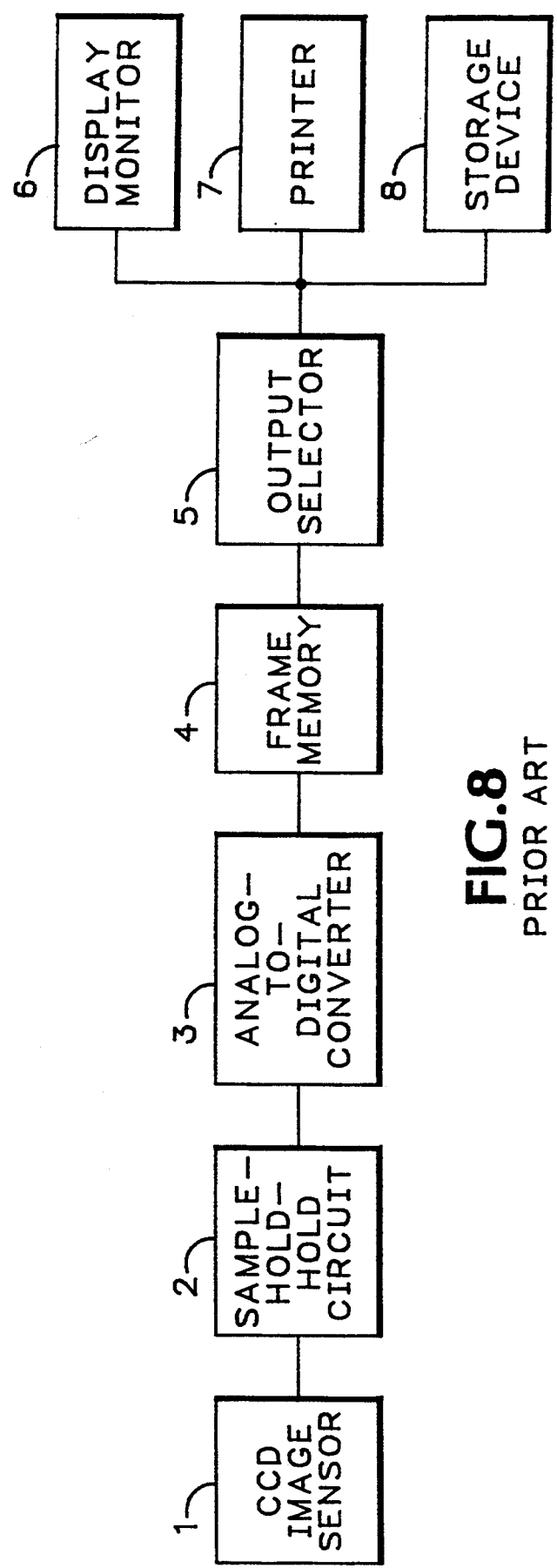
FIG. 8 shows a block diagram of the prior art image processing apparatus.

Referring to FIG. 3, the image processing process of the present invention has the same construction as that of FIG. 8 except that circuits for emphasizing edge components of image data and smoothing uniform components thereof as represented by a dotted line are constituted between the frame memory and output selector. In FIGS. 3 and 8, identical numerals represent identical or equivalent parts.

For example, the image processing apparatus of the present invention further comprises a mode determining circuit 100 for receiving predetermined data of the frame signal applied from said frame memory 4 and determining if each of the pixels calls for a mode for emphasizing edge components of an image, a mode for smoothing uniform components thereof or a normal mode in accordance with mutual relations of adjacent pixels of the image to generate respective controlling signals for the respective modes;

an emphasizing circuit 200 for performing a first computing operation so as to generate edge component emphasized data, when a controlling signal from said mode determining circuit 100 is provided for the edge component emphasizing mode;

a smoothing circuit 300 for performing a second computing operation so as to generate uniform component smoothed data, when a controlling signal from the mode determining circuit 100 is provided for the smoothing mode;

a first buffer means 901 for storing the edge component emphasized data from said emphasizing circuit 200;

a second buffer means 902 for storing the unconverted data from the mode determining circuit 100; and a third buffer means 903 for storing the uniform component smoothed data from said smoothing circuit 300, wherein the data stored in the first, second and third buffer means 901, 902, 903 are selectively outputted in accordance with determination of each mode in the mode determining circuit 100 and the outputted data are provided to the external devices through the outputting selector 5.

The theoretical background of the present invention will be described hereinafter with reference to FIGS. 1A to 1B and FIGS. 2A to 2C.

Figure 2A:
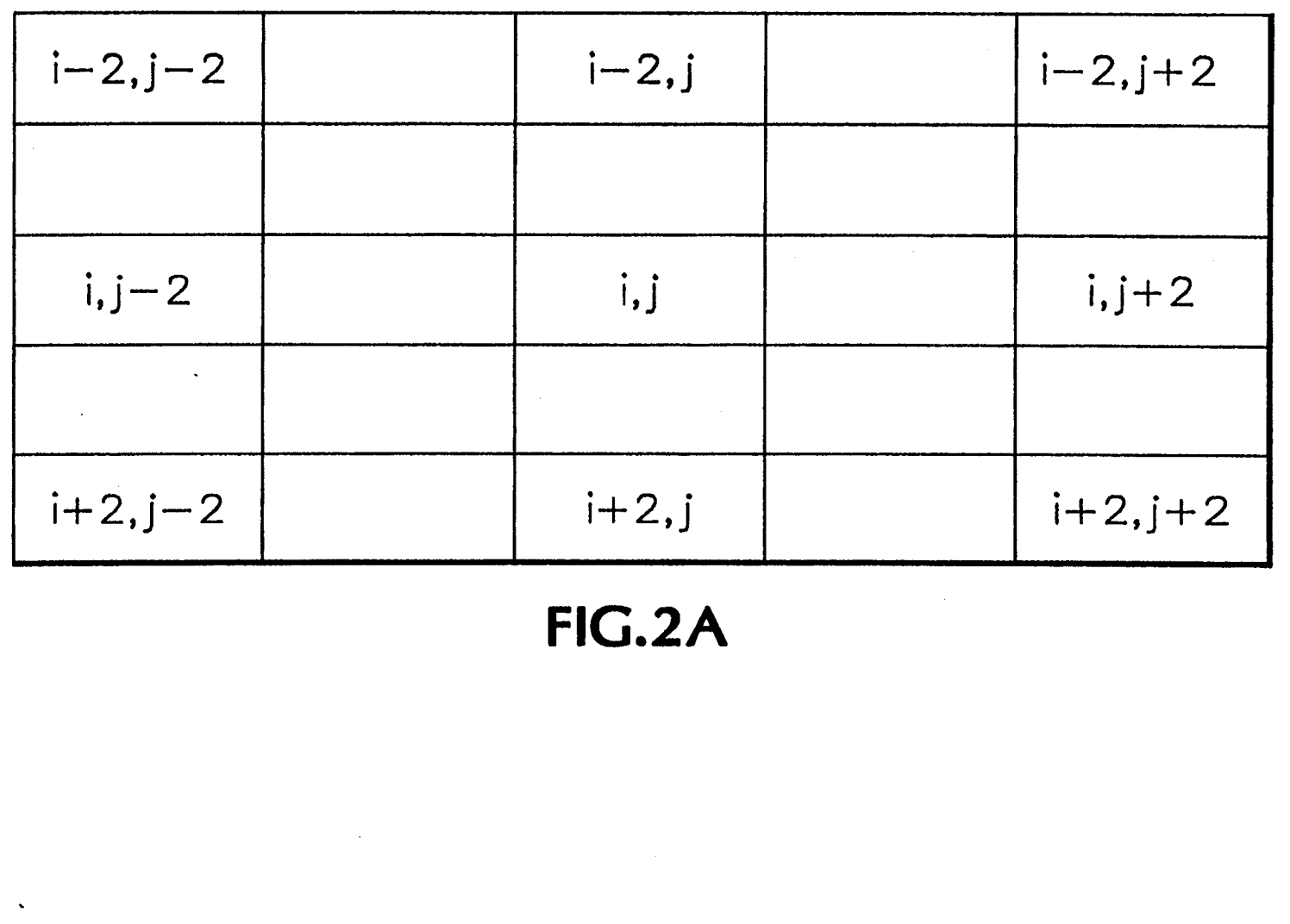
Figure 2B:
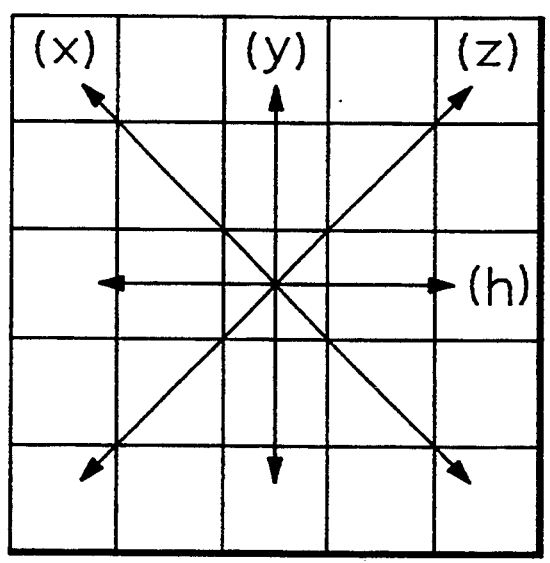

FIGS. 1A and 1B illustrate coordinate values shown in a 5 by 5 (5*5) window of image data applicable to the present invention, and pixel values corresponding to the coordinate values. FIGS. 2A and 2C illustrate values corresponding to the coordinate values. FIGS. 2A to 2C illustrate coordinate values of only edge components in the coordinate values shown in FIG. 1A, respective computing directions of the coordinate values of the edge components, and computing expressions according to the respective computing directions.

In FIG. 1A, coordinate values as image data stored in a 5 by 5 block memory as the frame memory 4 are described as $(i-2, j-2)$, $i-2, j-1)$, $(i-2, j)$, ..., $(i, j)$, .., etc. When referred to a pixel value of a specific one of the coordinates as $P(i,j)$, pixel values corresponding to the respective coordinate values are described as $P(i-2, j-2)$, $P(i-2, j-1)$, $P(i-2, j)$, ... $P(i,j)$, ..., etc., as shown in FIG. 1B.

With reference to FIGS. 2A and 2B, when a coordinate value of respective pixels as shown in FIG. 1B is represented by $P(i, j)$, the difference value of two adjacent edge pixels can be obtained in accordance with horizontal, vertical, diagonal, and opposite diagonal directions of the coordinate, as shown in FIG. 2C. Then, a maximum value SEL of the obtained difference values can be obtained. For example, a pixel component SUB(1) of the opposite diagonal-computing direction "x" in the coordinate system may be obtained by a computing expression of $P(i-2, j-2) - P(i+2, j+2)$, a pixel component SUB(2) of vertical computing direction "y" by a computing expression of $P(i-2,1) -- P(i+2, j) 1$, a pixel component SUB(3) of a diagonal computing direction "z" by a computing expression of $P(i2, j+2) - P(i+2, j-2)$, and a pixel component SUB(4) of the horizontal computing direction "h" by a computing expression $P(i, j-2) - P(i, j+2) 1$. Also, the maximum value SEL may be obtained by the following computing expression:

$$\text{MAX } \{(\text{SUB}(1), \text{SUB}(2), \text{SUB}(3), \text{SUB}(4))\}$$

If the maximum value SEL is greater than a first reference value T1 for detecting edge components of pixels, the pixel component P(i,j) thus inputted from the frame memory 4 is determined as one of pixels having the edge components to be provided for performing an edge component emphasizing computation. If the maximum value SEL is less than a second reference value T2 for detecting uniform components of pixels, the pixel component P(i,j) inputted therefrom is determined as one of pixels having the uniform components to be provided for performing a uniform component smoothing computation. Also, if the maximum value SEL is between the reference values T1 and T2, the pixel component P(i,j) is determined as one of pixels having the normal component not to be provided for performing an additional computation.

Briefly, the computations as described above are as follows:

SEL>T1: perform computation for emphasizing an edge component P(i,j)

SEL≦T2: perform computation for smoothing a uniform component P(i,j)

T2≦SEL<T1: directly output a normal component P(i,j)

In the image processing apparatus, when the pixel component P(i,j) belongs to the edge components, respective weighted values in a 5 by 5 window as shown in FIG. 7A are multiplied by the pixel value of an original image so that respective multiplied values can be obtained, and then the respective multiplied values are added to one another. As a result, the sum of the respective multiplied values can be obtained as edge component emphasized data.

Here, when an overflow occurs in the sum, the sum is reset to a maximum value set in advance to prevent the lowering of image quality due to the overflow of the sum. For example, the pixel value of the original pixel is a digital signal corresponding to a difference signal or a luminance signal of the pixel, which is set between 0 and 255 with respect to eight bits. If each pixel value of the upper pixels positioned on the center pixels as shown in FIG. 7A has 80 and each pixel value of the lower pixels positioned below the center pixels has 8, the sum becomes 107. Therefore, the pixels having the edge component are further emphasized in color difference or luminance. If each pixel value of the upper pixels positioned on the center pixels as shown in FIG. 7A has 240 and each pixel value of the lower pixels positioned below the center Pixels has 80, an overflow occurs. This is because the sum becomes 400. Accordingly, the sum is reset to the maximum value of 255.

Similarly to the above described computation to obtain the edge component emphasized data, in the image processing apparatus, when the pixel component P (i,j) is belongs to uniform components, respective weighted values in a 5 by 5 window in which centered weighted value of center pixels is 2 and each of weighted values of the others is 1 as shown in 7B are multiplied by the pixel value of an original image so that respective multiplied value can be obtained. Also, the respective multiplied values are added to one another and then the added data are divided by ten. The resulting values obtained by means of the computation are provided for increasingly smoothing uniform components of an image.

Accordingly, according to the present invention, it is understood that pixels positioned at edge areas can be emphasized further and pixels positioned at uniform areas can be enhanced further in the uniformity, and so distinctness of picture images can be improved.

First, referring now to FIG. 4, the operation of the mode determining circuit to determine corresponding mode in accordance with respective pixels of an image will be described hereinafter.

Figure 4A:
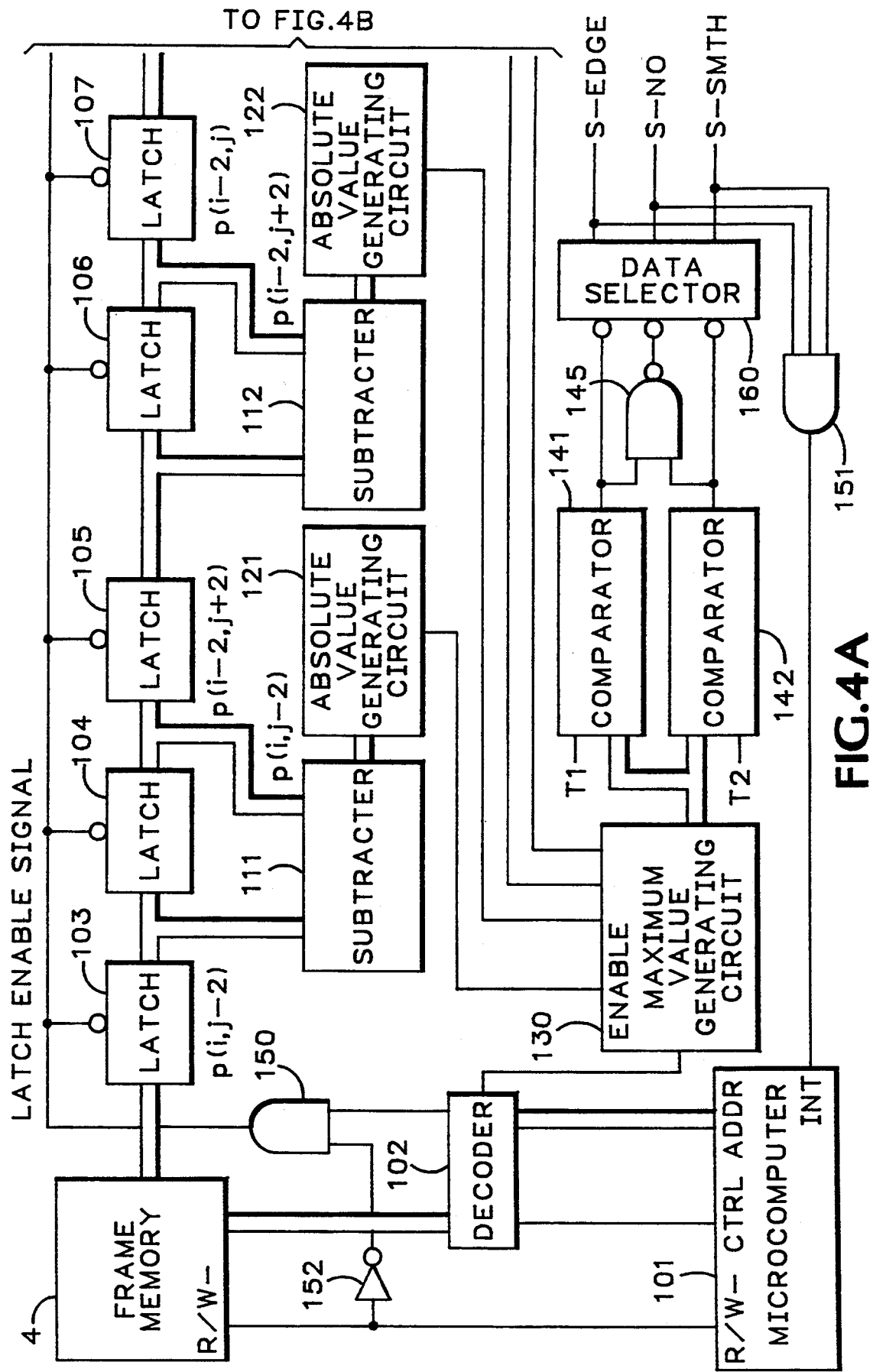
FIG. 4 shows a detailed circuit diagram of a mode determining means in the image processing apparatus as shown in FIG. 3.
Figure 4B:
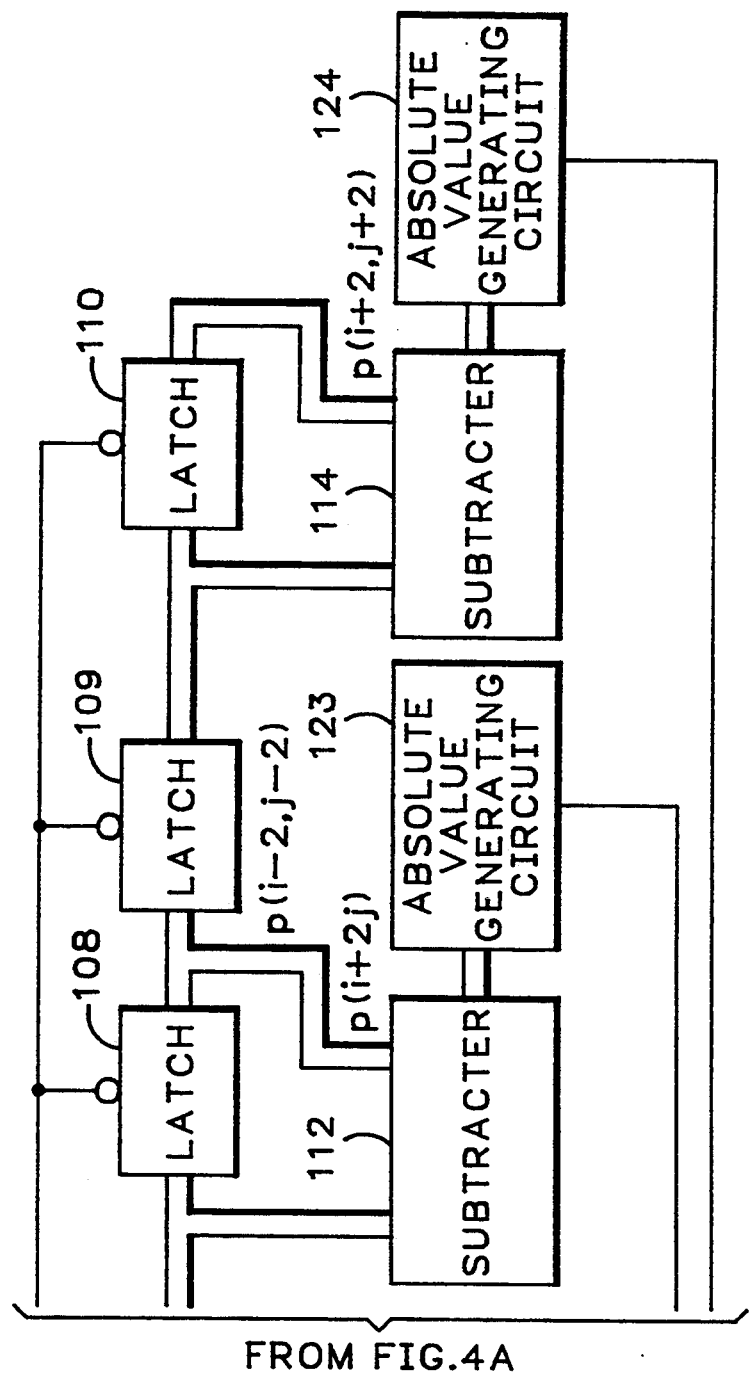

In FIG. 4, image data from the frame memory 4 are applied to a plurality of latches 103 to 110 by a predetermined latch enable signal as an outputting signal of an AND gate 150 which receives a read/write controlling signal from a microcomputer 101 and an enable signal from a decoder 102.

The decoder 102 receives and decodes controlling and address signals applied from the microcomputer 101 for controlling overall functions by using a controlling program stored in an internal storing means thereof in order to output the enable signal.

By the latch enable signal to be applied from an AND gate 150, coordinate values of an image data applied from the frame memory 4 are sequentially stored in the respective latches 103 to 110. That is, the edge components of the coordinate values in the 5 by 5 window coordinate, $P(i+2,j+2)$, $P(i-2,j-2)$, $P(i+2,j)$, $P(i-2,j)$, $P(i+2,j-2)$, $P(i-2,j+2)$, $P(i,j+2)$, and $P(i,j-2)$ are sequentially stored in the latches 110 to 103.

The data $P(i,j-2)$ and $P(i,j+2)$ from the latch 103 and 104 are subtracted from each other by means of a subtracter 111 and the resulting value is applied to an absolute value generating means 121 to obtain the absolute value SUB(4) of the resulting value as shown in FIG. 2C. By using the above mentioned method, respective absolute values SUB(3), SUB(2), SUB(1) with respect to the other edge components can be obtained.

The absolute values SUB(1) to SUB(4) thus obtained are applied to a maximum detecting means 130 to generate a maximum value SEL thereof, and then the maximum value SEL ia applied to first and second comparators 141 and 142 in order to detect edge and uniform pixels. In the first comparator 141, the maximum value SEL and a first reference value T1 for detecting edge components are compared, and in the second comparator 142, the maximum value SEL and a second reference value T2 for detecting uniform components.

If the maximum value SEL is greater than the first reference value T1, the first comparator 141 outputs a logic level "0", and if not, the first comparator 141 outputs a logic level "1". Also, if the maximum value SEL is less than the second reference value T2, the second comparator 142 outputs a logic level "0", and if not, the second comparator 142 outputs a logic level "1".

Moreover, the outputs of the comparators 141 and 142 are applied to a data selector 160 and a NAND gate 145. In the NAND gate 145, when all the outputs of the comparators 141 and 142 are "I", "0" is provided for the data selector 160. When at least one of the outputs of the comparators is "0", in the NAND gate 145 "1" is provided for the data selector 160.

If the output of the NAND gate 145 is "1" and the output of the comparator 141 is "0", the data selector 160 determines inputted pixel as one that calls for the edge component emphasis mode and outputs a controlling signal S-EDGE for enabling the edge component emphasizing circuit 200.

Also, if the output of the NAND gate 145 is "1" and the output of the comparator 142 is "0", the data selector 160 determines inputted pixel as one that calls for the uniform smoothing mode and outputs of uniform components to output a controlling signal S-SMTH for enabling the uniform smoothing circuit 300.

If all the outputs of the comparators 141 and 142 are "1", the data selector 160 determines the inputted pixel as one of normal components and outputs a controlling signal S-NO for directly providing the inputted pixel values for the output selector 5.

On the other hand, all the controlling signals are applied to an input terminal INT of the microcomputer 101 through an AND gate 151. The input terminal INT of the microcomputer 101 is activated by the output of the AND gate 151, the microcomputer controls the frame memory 4 in order that the data stored in the frame memory 4 are provided on a data bus connected with the latches 103 to 110.

Figure 5A:
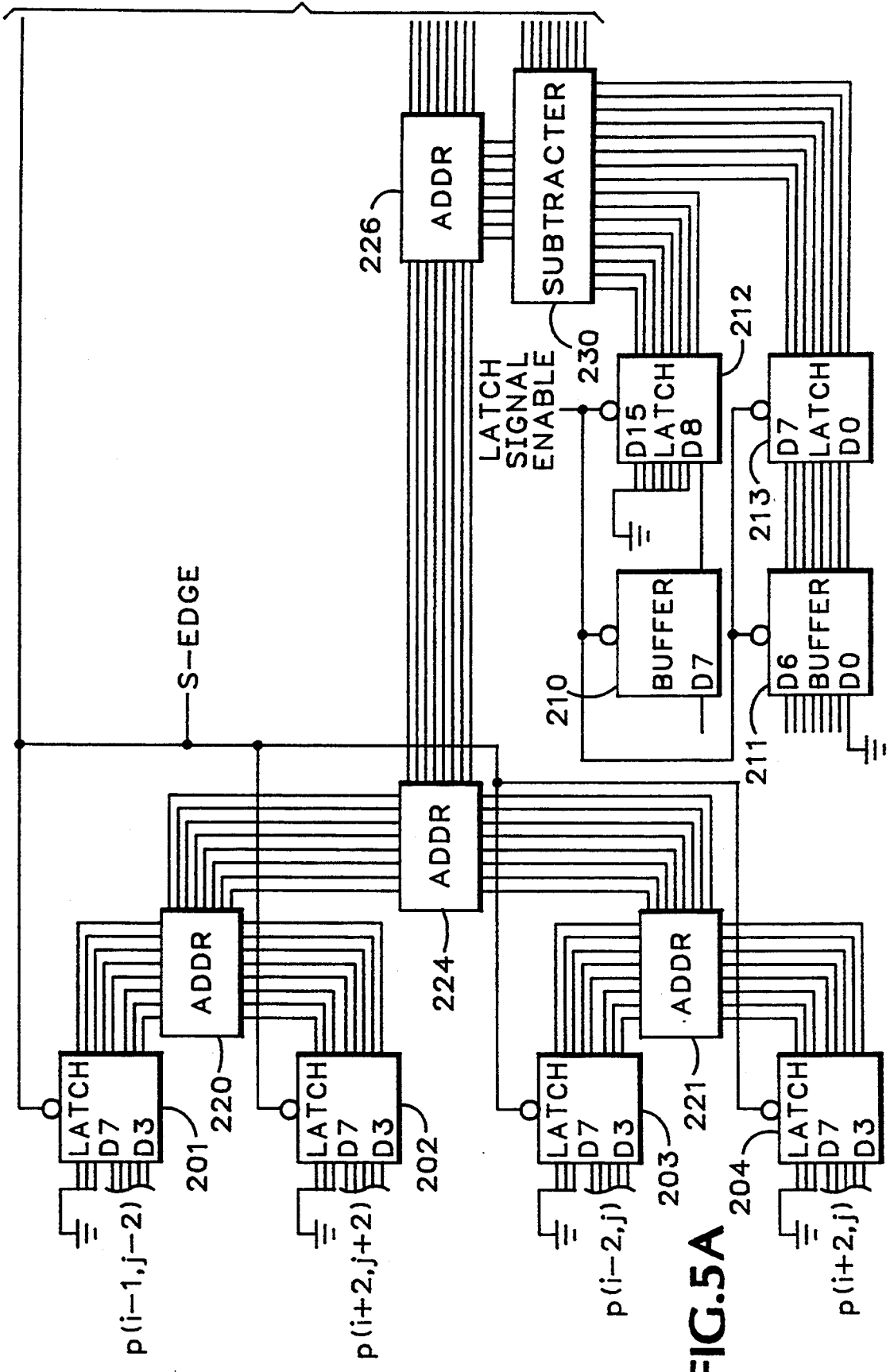
FIG. 5 shows a detailed circuit diagram of an edge component emphasizing circuit in the image processing apparatus as shown in FIG. 3.

The operation of the edge component emphasizing circuit will be described hereinafter with reference to FIG. 5.

In order to divide the data of the respective latches 103 to 110 by eight, five high-order bits D7 to D3 of each of the latches 103 to 110 are applied to five low-order input terminals of each of dividing latches 201 to 208, three high-order input terminals as the three remaining input terminals of each of the dividing latches 201 to 208 are grounded.

The outputs of the dividing latches 201 to 208 are added from each other by means of adders 220 to 226 and then the added value is applied to a subtracter 230.

When the input terminal INT of the microcomputer is activated, the data P(i,j) from the microcomputer is applied to multiplying buffers 210 to 213 in order to multiply the data P(i,j) by two. The 16-bit data of the buffers 210 to 214 and the added value are subtracted from each other by means of the subtracter 230 and then the resulting value is applied to an absolute value generating means 240 to output the absolute value of the resulting value. The absolute value as edge component emphasizing signal is applied to the output selector 5 through the first buffer circuit 901. Then, the first buffer circuit 901 outputs the absolute value in synchronizing with the controlling signal S-EDGE.

Figure 6:
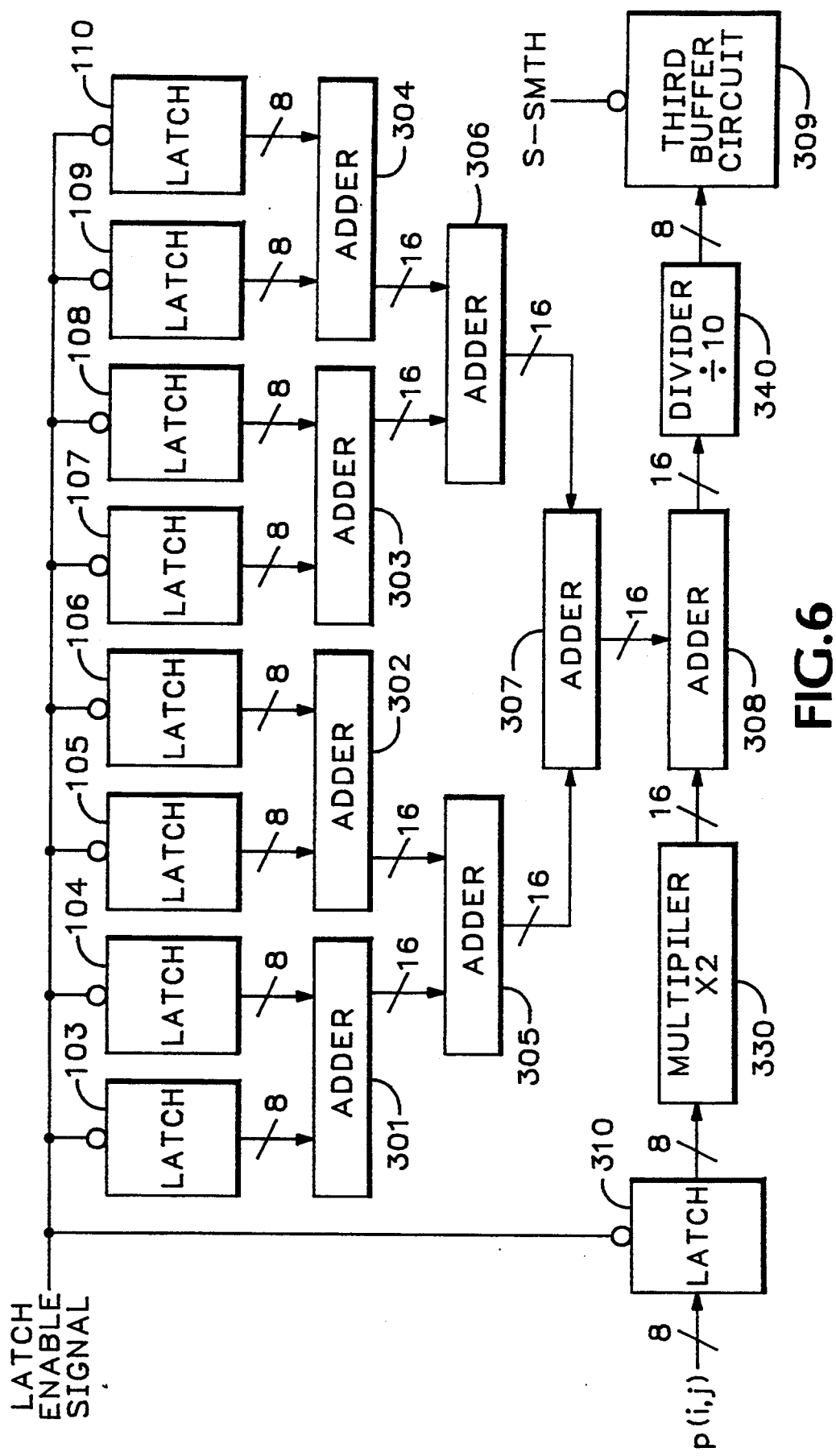
FIG. 6 shows a detailed circuit diagram of a uniform component smoothing circuit in the image processing apparatus as shown in FIG. 3.

Next, the operation of the uniform component smoothing circuit will be described hereinafter with reference to FIG. 6.

All the data stored in the respect latches 103 to 110 are added from each other by means of adders 301 to 307 to output the sum. The data P(i,j) from the microcomputer is multiplied by two by means of a multiplier 330 in order to output the resulting value.

The sum and the resulting value are added from each other by means of an adder 308, and then the output of the adder 308 is divided by ten by means of a divider 340. The output of the divider 308 ia applied to the output selector 5 through the third buffer circuit 903. Then, the third buffer circuit 903 outputs the stored data in synchronizing with the controlling signal S-SMTH.

By the above described sequence, after the completion of emphasizing edge components of a specific image data and smoothing uniform components thereof, the microcomputer performs the following sequence so that distinctness of picture images can be improved.

According to the present invention, since the image processing apparatus is possible to process image data by a corresponding expression in accordance with one of edge component emphasizing mode, uniform component smoothing mode and normal mode, the apparatus can further emphasize edge components thereof so that distinctness of picture images can be enhanced. Also, the apparatus can remove general noise components of image signals, but also is suitable for real time processing because of hardware construction.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An image processing apparatus for emphasizing edge components of an image signal, the apparatus comprising:
   (a) an analog-to-digital converter for converting an analog image signal applied from an image sensor into digital image data;
   (b) a frame memory for storing the digital image data and outputting a frame signal;
   (c) mode determining means for receiving the frame signal as coordinate data of pixels in a pixel window and determining if at least one of said pixels belongs to an edge component pixel a smoothing component pixel or a normal component pixel, in accordance with relations of adjacent pixels of the image signal, wherein the mode determining means comprises a microcomputer for generating control signals necessary for determining the mode by performing a controlling program stored in a storage device therein, the control signals comprising address, signal, and read/write signals; a decoder for decoding the address signal from the microcomputer and outputting an enable signal; and NAND gate for receiving the enable signal and the read/write signal applied from the microcomputer to the frame memory and outputting a latch enable signal; latching means for storing the coordinate data of the frame signal applied from the frame memory by the latch enable signal; first computing means for calculating the difference value of two adjacent pixels positioned in accordance with horizontal, vertical, diagonal or opposite diagonal directions of the coordinate data, respectively, and outputting absolute values of respectively calculated difference values; maximum value detecting means for detecting a maximum value of the absolute values in response to the enable signal applied from said decoder; comparing means for comparing the maximum value with first and second reference values set to detect edge and uniform components of a pixel, respectively; a NAND gate for receiving signals from said comparing means; and a data selector for receiving signals from the comparing means and the NAND gate to selectively generate mode determined signals;
   (d) edge component emphasizing means for generating edge component emphasized data based on a first weighted reference value, when the coordinate data are output as the coordinate value of the edge component pixel from the mode determining means; a smoothing means for generating uniform component smooth data based on a second weighted reference value, when the coordinate data are output as the coordinate value of the uniform component pixel from the mode determining means;

(e) first buffer means for storing the edge component emphasize data from said emphasizing means;

(f) second buffer means for directly storing the coordinate data of the pixel corresponding to the normal mode;

(g) third buffer means for storing the uniform component smoothed data from said smoothing means; and, (h) an outputting selector for selectively providing edge component emphasized data, the uniform component smooth data and the directly stored coordinate data in the second buffer means to external devices in accordance with a mode determined by the mode determining means.

2. The apparatus according to claim 1 wherein said comparing means generates the mode determined signal for emphasizing the edge components when the maximum value from the maximum value detecting means is greater than the first reference value set to detect the edge components of the pixel, the mode determined signal for smoothing the uniform components when the maximum value is less than or equal to the second reference value set to detect the uniform components of the pixel, and the signal for directly outputting the normal components when the maximum value is less than the first reference value and greater than the second reference value, and wherein the first reference value is set greater than the second reference value.

3. The apparatus according to claim 1 wherein said emphasizing means comprises means for calculating the product of each of the pixel values of the edge components and the first weighted reference value, which is set to produce the edge component emphasized data, to produce first calculated data and for outputting the sum of the first calculated data as the edge component emphasized data.

4. The apparatus according to claim 1 wherein said smoothing means comprises means for calculating product of each of pixel values of the uniform components and the second weighted reference value, which is set to produce the uniform component smoothed data, to produce a second calculated data and for outputting the sum of the second calculated data as the uniform component smoothed data.

* * * * *

UNITED STATES PATENT AND TRADEMARK OFFICE
CERTIFICATE OF CORRECTION

PATENT NO. : 5,381,490
DATED : January 10, 1995
INVENTOR(S) : Jae-Sub Shin

It is certified that error appears in the above-identified patent and that said Letters Patent is hereby corrected as shown below:

| | | |
|---|---|---|
| Column 1, Line 29: | delete "lest" insert -- least -- | |
| Column 4, Line 31: | delete "and" after 2A insert -- to -- | |
| Column 4, Line 40: | after first "," insert -- ( -- | |
| Column 4, Line 67: | after "{" insert -- ( -- | |
| Column 6, Line 38: | delete "ia" insert -- is -- | |
| Column 6, Line 62: | after "determines" insert -- that the -- | |
| Column 7, Line 54: | delete "ia" insert -- is -- | |
| Column 8, Line 1 : | after "components" insert -- of image data and can further smooth uniform components -- | |

UNITED STATES PATENT AND TRADEMARK OFFICE
CERTIFICATE OF CORRECTION

PATENT NO. : 5,381,490
DATED : January 10, 1995
INVENTOR(S) : Jae-Sub Shin

It is certified that error appears in the above-indentified patent and that said Letters Patent is hereby corrected as shown below:

Column 7, line 54, delete "is" insert --is--.

Column 8, line 1, after "components" insert --of image data and can further smooth uniform components --.

Signed and Sealed this

Sixteenth Day of May, 1995

*Attest:*

BRUCE LEHMAN

*Attesting Officer*     *Commissioner of Patents and Trademarks*